United States Patent [19]

Inoue et al.

[11] Patent Number: 4,825,965
[45] Date of Patent: May 2, 1989

[54] WEIGHING APPARATUS AND METHOD

[75] Inventors: Shinichi Inoue; Shinji Yamashita, both of Kobe, Japan

[73] Assignee: Yamato Scale Company, Limited, Japan

[21] Appl. No.: 163,716

[22] Filed: Mar. 3, 1988

[30] Foreign Application Priority Data

Mar. 3, 1987 [JP] Japan ................... 62-49856

[51] Int. Cl.⁴ .................. G01G 9/00; G01G 23/10
[52] U.S. Cl. .................... 177/25.14; 177/1; 177/185
[58] Field of Search .............. 177/75.14, 185, 1; 364/575

[56] References Cited

U.S. PATENT DOCUMENTS 4,379,495 4/1983 Cocks et al. ............. 177/185 X

Primary Examiner—George H. Miller, Jr.
Attorney, Agent, or Firm—Senniger, Powers, Leavitt and Roedel

[57] ABSTRACT

A load cell produces an oscillating signal indicative of the weight of the product. The maximum and minimum values of the oscillating signal are determined to provide a reference value which is an average of the maximum and minimum values. Using the reference value for the starting point and ending point, one cycle of the oscillating signal is identified and integrated to determine the corresponding weight of the product. The apparatus compensates for errors in the relationship between the actual starting and ending points of the cycle and the reference value.

38 Claims, 10 Drawing Sheets

FIG. 2
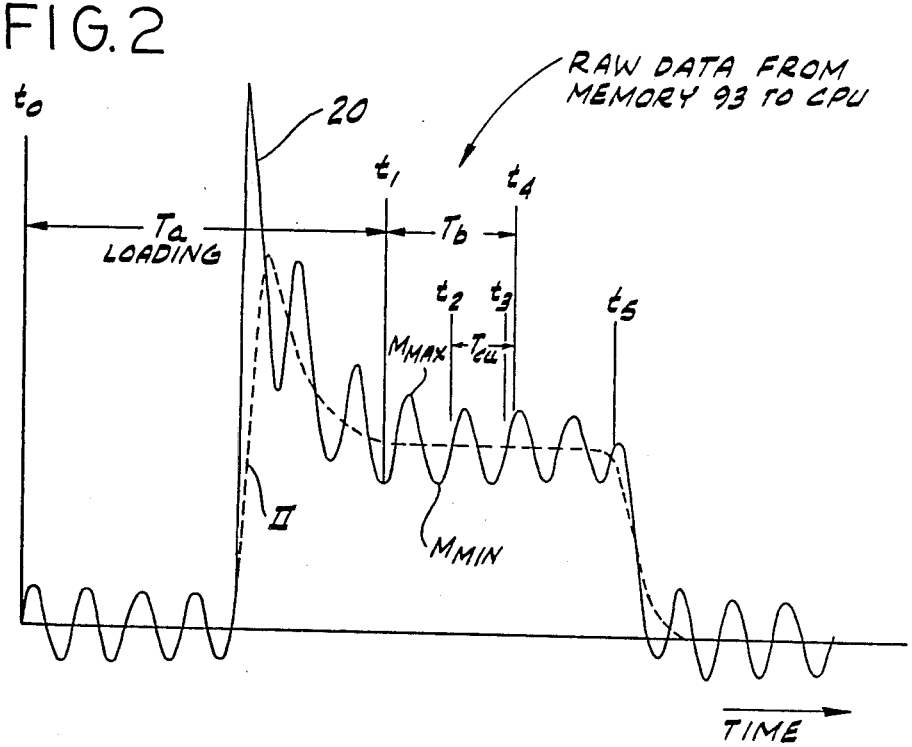
FIG. 3
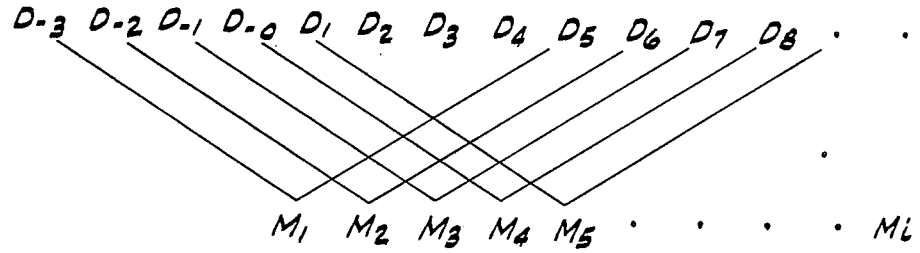
FIG. 4

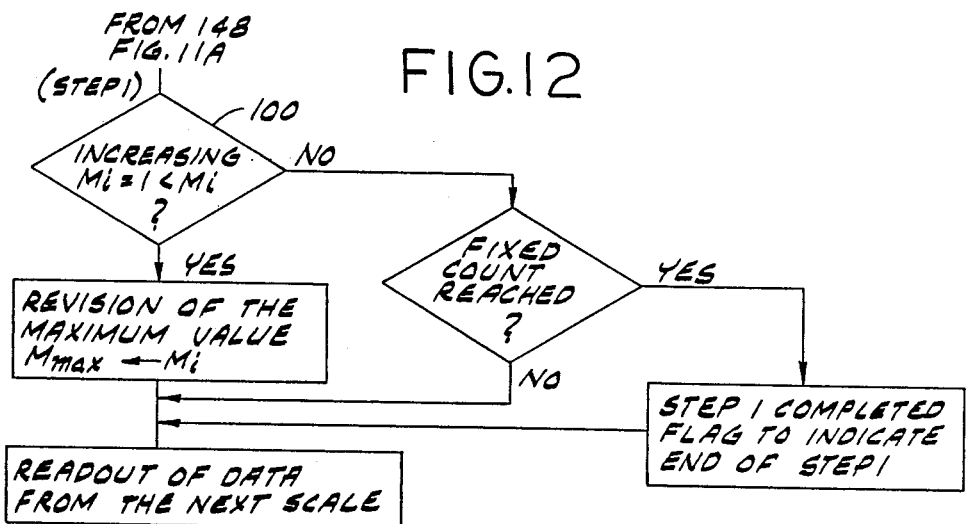

WEIGHING APPARATUS AND METHOD

FIELD OF THE INVENTION

This invention relates to a weighing method used in scales and other weighing devices, and especially to a weighing method capable of providing an accurate measurement of material being weighed prior to the point when the elastic mechanism supporting the material being weighed stops oscillating and reaches equilibrium or a steady state.

BACKGROUND OF THE INVENTION

In recent years rationalization has advanced in every field, and, in the field of scales and other weighing devices as well, there has been a demand for faster, more accurate weighing devices.

For example, the decision on whether or not to purchase new weighing devices is determined by the merits of the purchase. In other words the decision to purchase depends upon how much processing time will be saved by the new devices and how much of the waste caused by allowances of excessive amounts due to the insufficient precision of existing weighing devices can be eliminated by the new devices.

Small-capacity scales utilizing the prior art common load cell methods use a mechanism called a "parallelogram". They are also equipped both with oil dampers to attenuate oscillation and with an analog-type higher-order filter before or after the amplifier in order to attenuate any harmful oscillation.

In a scale employing the common load cell method it is not possible to sufficiently attenuate the oscillation outputs from associated mechanical devices using only oil dampers. Therefore, the filter mentioned above must be a low-frequency range, low-pass filter with a cut-off frequency of approximately several hertz which is capable of functioning effectively to attenuate the oscillating output caused by the mechanical devices of the scale.

However, when this type of low-frequency range, low-pass filter with a cut-off frequency of approximately several hertz is used, the signal response during measurement is subjected to considerable delay, and, for practical purposes, there are limits with respect to the amount that the measurement time can be shortened.

Some weighing devices integrate the output signal from a load cell, etc., and divide this integral by the time span (also called the "interval") of the integration in order to obtain a primary estimate of the weight of the material being weighed.

Thus, the weighing methods described above increase in accuracy each time the processing operations, including the integrations, are repeated. However, in order to obtain a high degree of accuracy, it is necessary to repeat the processing operations, including the integrations. This results in a longer measurement time (processing time), thus making this method unsuitable for the high-speed weighing processing which is necessary in the "fight against the clock" so prevalent today.

SUMMARY OF THE INVENTION

It is an object of this invention to provide a weighing method using a load cell or other electric scale which does not employ oil dampers or other special oscillation/damping devices. It is another object of this invention to provide a weighing apparatus and method having an elastic mechanism which in a state of oscillation produces a weight indicative, oscillating signal, and which executes processing operations based on data which includes this oscillation signal in order to determine an estimate of the weight of the material being weighed at or prior to the time when the receptacle (a hopper or other bucket) holding the material being weighed comes to rest after loading. It is another object of this invention to provide such an apparatus and method in which the correct weight of the supplied material being weighed can be obtained in a shorter time than possible with previously available weighing devices.

It is an object of this invention to provide a method to obtain an estimated weight measurement value approximately 0.1–0.15 seconds after the material being weighed in the receptacle becomes stable or static relative to the receptacle following the completion of the loading of the material in the receptacle, i.e., about 0.44–0.5 seconds after the loading of the material is begun. In other words, it is an object of this invetion to obtain an estimated weight measurement value approximately 0.25–0.3 second faster than a conventional system equipped with oil dampers and analog filters. Moreover, it is an object to provide such a weight measurement value with a considerably high level of precision.

It is another object of this invention to provide a measurement devices equipped with multiple scales and capable of providing measurements which are faster and more accurate than those previously available and which is also inexpensive.

It is yet another object of this invention to provide a measurement method and device which have the advantage of not using parts which require regular inspection and maintenance, such as the oil dampers of conventional systems.

It is still another object of this invention, to provide a measurement device and method employing a standard, off the shelf, calculation or processing unit to perform necessary calculation processing, and to actually perform real-time processing for multiple scales simultaneously, thus providing an extermely high level of cost performance. In other words, in comparison to the systems which were hereto available, this invention also has the object of being capable of being realized at an extremely low cost.

The apparatus according to the invention is for weighing product. Means are provided for weighing the product and are adapted to produce an oscillating signal indicative of the weight of the product. First means determines a reference value of the oscillating signal. Second means is responsive to the reference value determined by the first means and identifies a portion of the oscillating signal having a predefined number of cycles. Third means integrates the portion of the oscillating signal identified by the second means. Fourth means determines the corresponding weight value of the product based on the integrated portion.

The method for weighing product according to the invention comprises the steps of:

weighing the product and producing an oscillating signal indicative of the weight of the product;

determining a reference of the oscillating signal;

identifying a portion of the oscillating signal having a predefined number of cycles based upon the determined reference value;

integrating the identified portion of the oscillating signal; and determining the corresponding weight value of the product based on the integrated portion.

BRIEF DESCRIPTION OF THE DRAWING

The following detailed description of the preferred embodiments of the weighing apparatus and method of this invention is based on the following drawings.

FIG. 2 is a graph of the magnitude of this weight signal vs. time illustrating the weight signal of one scale during measurement.

FIG. 3 is a chart of the memory illustrating the process by which data from the multiple scales is input into the successive raw digital data memory.

FIG. 4 is a chart illustrating the steps used in the method for the successive averaging of a single weight.

FIG. 12 is a flow chart showing step 1 (for calculating the maximum value $M_{max}$) which is part of the flow chart of FIG. 11.

FIG. 13 is a flow chart showing steps 2 and 3 (for calculating the minimum value $M_{min}$ and the reference value $W_r$) which are parts of the flow chart of FIG. 11.

DETAILED DESCRIPTION OF THE PREFERRED EMBODIMENTS

Figure 1:
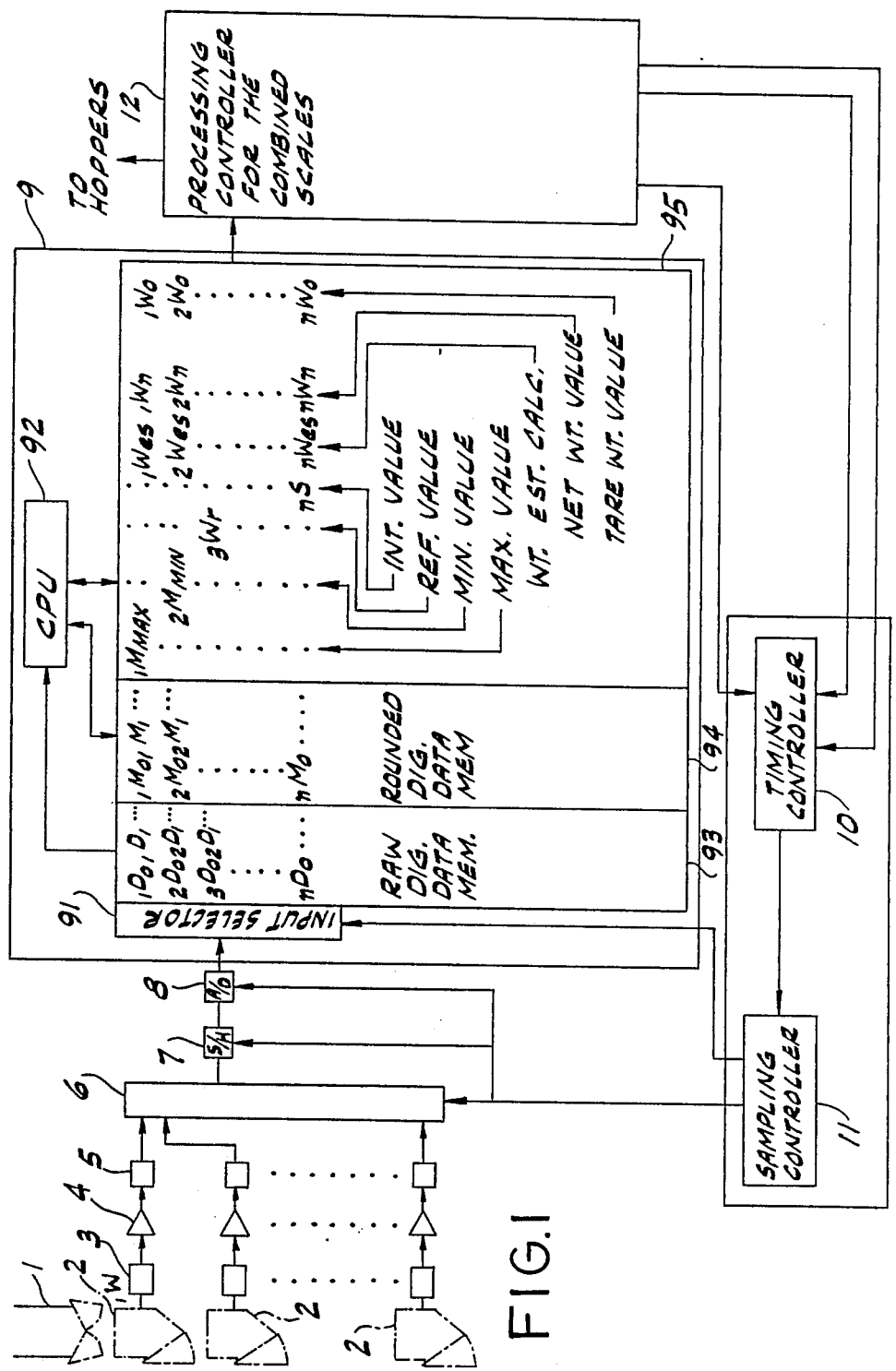
FIG. 1 is a block diagram of a combination weighing system according to the invention.

In FIG. 1, a relay hopper 1 guides the material to be weighed from a conveyance apparatus to one of a group of weighing hoppers 2, which holds the material during weight measurement. A scale (load cells $_1W - _nW$) 3 measures the weight of the material inside the weighing hopper 2, and provides an oscillating signal having an amplitude corresponding to weight of the material. Signal oscillations are caused, in part, by the mechanical oscillation of the hopper 2 as supported by the scale 3. The scales 3 may be part of a combination weighing apparatus and constitute means for weighing the product and adapted to produce an oscillating signal indicative of the weight of the product. An amplifier 4 amplifies the weight signal output from the scale 3. A supplementary low-pass filter 5 attenuates the weight signal to remove any oscillation in the signal which may occur within the undesirable frequency range (20-30 Hz and higher). A multiplexer 6 performs time-based selection of the weight signals from multiple scales 3 and provides these signals to means for sampling the oscillating signals such as sample-and-hold circuit 7 which temporarily stores the weight signals. The S/H circuit 7 provides the stored weight signals to means for converting each sample into a discrete value so that the oscillating signal, or portion thereof, is represented by a series of discrete values. This means for converting may be an analog-to-digital (A/D) converter 8 which converts the analog signals into corresponding digital signals and provide the digital signals to the processor 9. The timing and sequential operation of mulitplexer 6, S/H circuit 7 and A/D converter 8 are controlled by and respond to a sampling controller 11.

The processor 9 processes and calculates the weight of the material being weighed from the corresponding digital signals. Reference characters 91 through 95 refer to various parts of the processor 9. An input selector 91 selects the weight signal from the A/D converter 8 in response to a control signal from the sampling controller 11. A CPU (central processing unit) 92 performs the prcessing operations. A successive raw digital memory 93 stores the raw data of the weight signals that have been converted by A/D converter 8 into successive, corresponding digital data A successive rounded digital data memory 94 stores the data resulting from the rounding of the successive raw digital data. Reference character 95 designates a controller and memory for use by CPU 92.

A processing timing controller 10 and the sampling controller 11 operate in response to processing controller 12 for the combined scales 3. Controller 12 controls such operations as the opening and closing of hoppers 1, 2 of the combined scales 3.

The material to be weighed (not shown) is supplied from the relay hopper 1 to the weighing hopper 2. The weight of this material is measured by the scale 3 which generates an analog weight signal having an amplitude vs. time profile as shown by the solid line 20 of FIG. 2. This weight signal is then amplified by the amplifier 4, the signal in the harmful frequency range is attenuated by the supplementary low-pass filter 5, and the remaining signal is input to the multiplexer 6. In this way the weight signals from the multiple scales 3 are input to the multiplexer 6.

The signals provided to multiplexer 6 from the various load cells $_1W-_nW$ are successively selected one at a time by the multiplexer 6, and each selected signal is instantaneously stored in the sample-and-hold cirucit 7. This stored analog signal is then converted to a digital signal (as described below with regard to FIG. 7) by the A/D converter 8, passed through the input selector 91, and stored in the memory 93 as successive raw digital data D.

The various operations of the multiplexer 6, sample-and-hold circuit 7, A/D converter 8, and input selector 91 are synchronously, sequentially controlled by the sampling controller 11. In other words, the weight signals from the multiple scales are selected by the multiplexer 6 in accordance with a predetermined order and read into and stored in the successive raw digital data memory 93 via the sample-and-hold circuit 7, A/D converter 8, and input selector 91. When one cycle is completed, the multiplexer 6 returns to the first scale in the sequence and the cycle is repeated with each weight signal being read again. The switching of the input selector 91 is synchronized with that of the multiplexer 6, and selector 91 directs weight signals for successive storage in the memory ranges or addresses which correspond to the scale numbers.

Thus, with a weighing apparatus provided with multiple scales such as the embodiment illustrated in FIG. 1, the weight signals from the various scales are sequentially read and stored in the memory 93 as sequential progressions representing the weight in the scales as the scales are filled. Note that in FIG. 3, the subscripts "n" preceding the weight signals $_nD_i$ indicate the numbers assigned to the scales, and the subscripts "i" following the signals $_nD_i$ indicate the sequential order in which the signals are input to the memory 93. For example, $_2D_0$ indicates the initial (o) reading of scale number two.

The weight signals which are stored in the memory 93 as noted above and shown in FIG. 3 are processed in the following manner. The following is an explanation of the processing of the weight signal of one scale (for example, the scale assigned the number "1"). The weight signal of all other scales are similarily processed.

First, readout of the successive raw digital data stored in the memory 93 is begun at the time when loading of the weighing hopper 2 is complete and the material being weighed in this weightment is contained in and completely comes to rest within the receptacle. The data which is read out is input to the CPU 92. As shown in FIG. 2, the elapse of time $T_a$ represents the period of time during loading and beginning with the start of the supply of material to be weighed (the opening of the gate of the relay hopper 1 gate at time $t_0$). The data is read from time $t_1$ and input to the processor 9. This time $T_a$ is preset in advance to an appropriate time and depends upon the amount of material being supplied each time, as well as other parameters which may be considered.

The beginning of the readout of new data in the memory 93 is effected as follows: the processing timing controller 10 receives at time $t_0$ the material supply start signal command from controller 12. Controller 10 also receives a signal indicating the amount of one batch to be supplied. In response to the one batch supply amount signal, at time $t_1$ controller 10 outputs a signal after the period of time $T_a$ has elapsed from time $t_0$. This output signal commands the sampling controller 11 to begin reading data from the memory 93 into CPU 92 at time $t_1$. The data is read from the memory 93 into the CPU 92 continuously beginning with time $t_1$ for the elapse of the period of time $T_b$ until time $t_4$.

Each time a new bit of data is read from the memory 93 into the CPU 92, successive averaging processing of data may be optionally, concurrently performed in order to attenuate any unnecessary oscillation component in the data resulting from other than the natural oscillation of the scale, i.e., oscillations at other than the eigenfrequency. If there is no unnecessary oscillation component, or if there is no effect from the unnecessary oscillaton component, successive averaging processing is unnecessary. This successive averaging processing is a series of steps or operations in which successive averaging is performed. The average is preferably calculated from one-half of the number of samples for one cycle of the scale's eigenfrequency as the number of bits of data per average. Some other appropriate number which is less than one-half the number of samples may also be used. In the specification, this successive averaging processing may be referred to as "rounding".

The successive averaging processing is performed by using the CPU 92 and its controller and memory 95 for CPU 92, which are contained in the processor 9. As shown in FIG. 4, each time a new bit of raw data D is read into the CPU 92 the oldest bit of data is discarded in the averaging process. As shown in FIG. 4, $M_i$ (i=1,2, ...) indicates the successive average of $D_{i-4}$ — $D_{i+4}$. Thus, $M_1$ is the average beginning with $D_{-3}$ and ending with $D_5$. When CPU 92 receives the next bit of data ($D_6$) the oldest data bit ($D_{-3}$) is discarded and $M_2$ is the average beginning with $D_{-2}$ and ending with $D_6$. Operating as indicated above, the processor 9 comprises means for rounding each discrete value provided by A/D converter 8.

Figure 5:
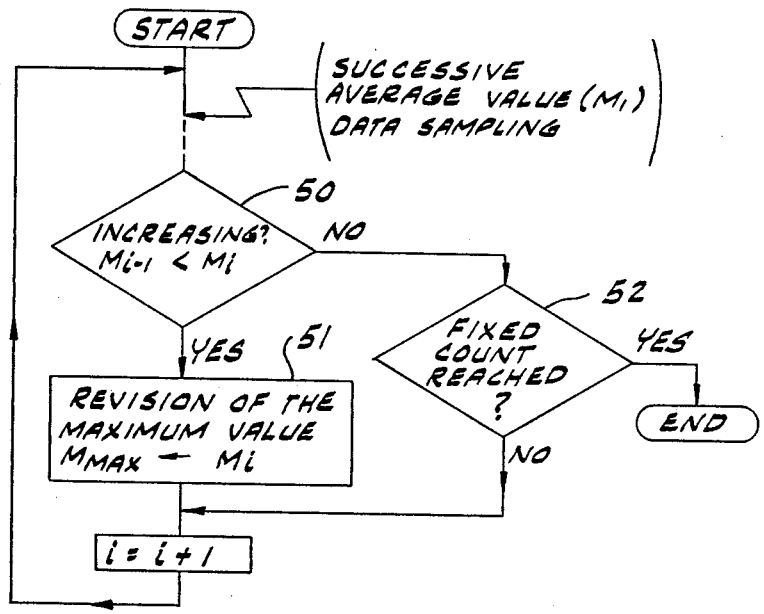
FIG. 5 is a flow chart illustrating the portion of the method according to the invention for finding the maximum value.

In this way, the rounded raw data is stored in the memory 94. In accordance with the flowchart shown in FIG. 5, the CPU 92, using this recorded data, determines a reference value such as the first maximum value $M_{max}$. To calculate the value $M_{max}$, CPU 92 uses data generated subsequent to the time $t_1$ at which the loading of the material into hopper 2 is completed and the material comes to rest within the receptacle. As shown in FIG. 2, the signals illustrated as sinusoidal oscillations subsequent to time $t_1$ would be used to calculate $M_{max}$ after time $t_1$. Referring to FIG. 5, successive bits of input data $M_i$ are calculated and stored. Each bit is then compared at step 50 with the previous bit of input data $M_{i-1}$. If $M_i$ is larger than $M_{i-1}$, $M_i$ is stored at step 51 as the maximum value $M_{max}$. If $M_i$ is less than $M_{i-1}$, step 51 is bypassed by step 52. This operation is repeated until the new data is consistently a smaller value than the data which preceded it for a preset number of comparisons, thus indicating that a fixed count has been reached and determining the maximum value $M_{max}$. Therefore, CPU 92 compares each successive discrete value with the previous highest discrete value to determine the maximum value.

Figure 6:
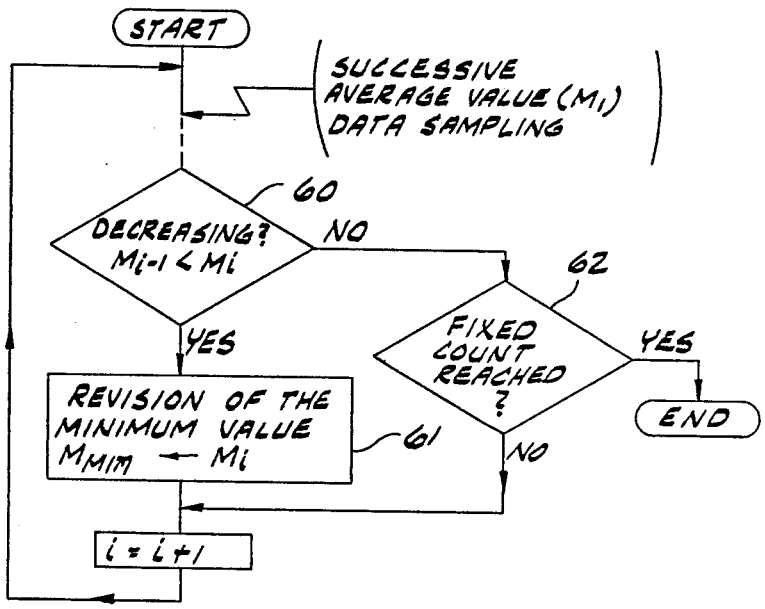
FIG. 6 is the flow chart illustrating the portion of the method according to the invention for finding the minimum value.

In the same way, a reference value such as the minimum value $M_{min}$ is determined in accordance with the flowchart shown in FIG. 6. The value $M_{i-1}$ at the point which the maximum value $M_{max}$ was determined as described above is used as the minimum value $M_{min}$, and then it is compared at step 60 with the next input data $M_i$, and the smaller of the two values is stored at step 61 as the minimum value $M_{min}$. This operation is repeated until the new data is consistently a larger value than the data which preceded it for a preset number of comparisons, thus indicating that a fixed count has been reached and determining via step 62 the minimum value of $M_{min}$. Therefore, CPU 92 compares each successive discrete value with the previous lowest discrete value to determine the minimum value.

Then, the maximum value $M_{max}$ and the minimum value $M_{min}$ determined in this way are stored in the controller and memory 95 for the CPU 92, which in accordance with the following Equation (1), calculates the reference value $W_r$ from these values $M_{max}$ and $M_{min}$.

$$W_r = \frac{M_{max} + M_{min}}{2} \quad \cdots (1)$$

Therefore, processor 9 functioning as discussed with respect to FIGS. 5 and 6 comprises means for determining a reference value of the oscillating signal 20.

Next, the CPU 92 uses this reference value $W_r$ to find the start point and the end point of a portion of the oscillating signal having a predefined number of cycles, such cycle or a predefined number of cycles such as an integer greater than one.

Processor 9 functioning as discussed with respect to FIGS. 7, 8a, 8b and 9 comprises means, responsive to the reference value, for identifying a portion of the oscillating signal having a predefined number of cycles. The size of the portion of signal depends on the desired accuracy and time of sampling. This portion of the oscillating signal corresponds to a series of discrete values of the successive rounded data $M_i$ following the minimum value $M_{min}$. In the region in which rounded data $M_i$ increases following the minimum value $M_{min}$, the point at which the successive digital data $M_i$ reaches or first exceeds this reference value $W_r$ is designated as the start point. The start point is a first value of the series and approximately equals the reference value $W_r$. In addition, after this curve continues to increase following this start point, passes through the next subsequent maximum value, continues through a decreasing region, reaches the next subsequent minimum value and once again enters an increasing region, the point at which it once again reaches or first exceeds the reference value $W_r$ is designated as the end point. The end point is the last value of the series and approximately equals the reference value $W_r$. Therefore, the oscillating signal is represented by a series of discrete values having a first value (the start point) and a last value (the end point).

Figure 7:
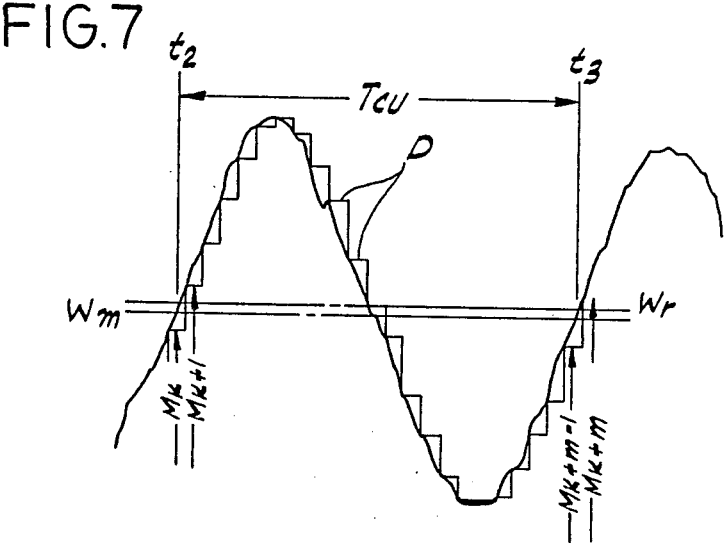
FIG. 7 is a graph of the magnitude of the weight signal vs. time illustrating an expanded view of one cycle of the weight signal during the period $T_b$ shown in FIG. 2.

In the interval between the start point and the end point (the average interval) determined in this manner is one cycle of the weight signal shown in FIG. 2 (period $t_2-t_3$ shown in FIGS. 2 and 7). The CPU 92 numerically integrates the rounded data which is the successive digital data of one cycle between the start point and the end point, and divides this integrated value S by the interval of one cycle (the number of samples in the interval), thus calculating the estimated weight $W_{es}$ of the material being weighed.

The following is a detailed explanation of the operation of the CPU 92 including the methods used to determine the start and end points, the integrated value S, and the estimated value of the weight of the material being weighed, according to one preferred embodiment of the invention. In addition, the CPU 92 compensates for errors in the relationship between the first value and the reference value $W_r$, and compensates for errors in the relationship between the last value and the reference value $W_r$ so that the integrated value S is very accurate.

In the preferred embodiment of the invention as illustrated in FIG. 1, one objective of which is to provide a high level of precision, the integrated value S is determined by numerically integrating three parts, as shown in Equation (2) below. If the time intervals (sampling intervals) between the successive digital data are small enough for the desired weighing precision, the start and end points which determine the numerical integration of the first term and the final term are close to the intersection of the ideal smooth curve and the reference value, and thus there is not a significant amount of error. However, if the sampling intervals are large, the sampling timing (center point in time) may only approximately match the intersection of the reference value $W_r$ and the smooth curve hypothesized from the successive digital data, as shown in FIGS. 8(a) through 9(b), thus causing error. In order to minimize this error the following Equation (2) is used to calculate the integrated values:

$$S = S_a + \Delta S_b + \Delta S_e \tag{2}$$

$S_a$ is the integrated value of one cycle of the rounded successive digital data, i.e., the series of discrete values representing the oscillating signal, not including the first and final terms. $\Delta S_b$ is the integrated value of the first (beginning) term, and $\Delta S_e$ is the integrated value of the final (end) term. CPU 92 integrates the first value of the series of discrete values to obtain $\Delta S_b$, integrates the last value of the series to obtain $\Delta S_e$ and integrates the discrete values therebetween to determine $S_a$.

In this embodiment, $S_a$, $\Delta S_b$, and $\Delta S_e$ are determined as descried below. First, the explanation will describe the procedure for determining the start (beginning) point and then the procedure determining the integrated value of the first term $\Delta S_b$ from this start point. To facilitate calculations, $T_s$ is represented by a unit time hereinafter, i.e., assume $T_s = 1$.

Figure 8A:
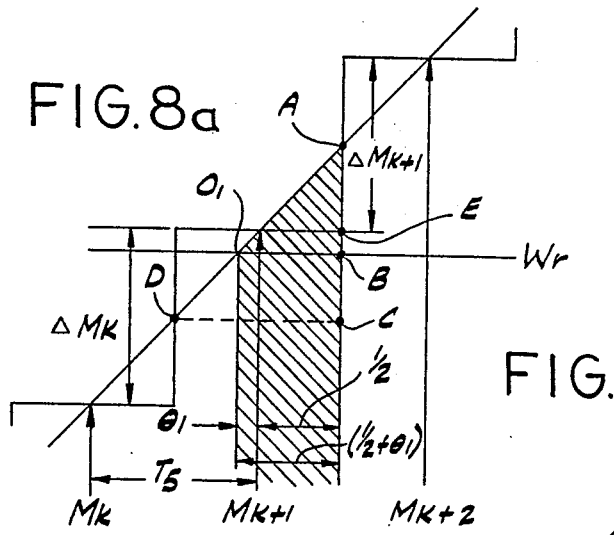
FIGS. 8(a) and (b) are charts showing the detailed conditions of the start point and the first term from FIG. 7.
Figure 8B:
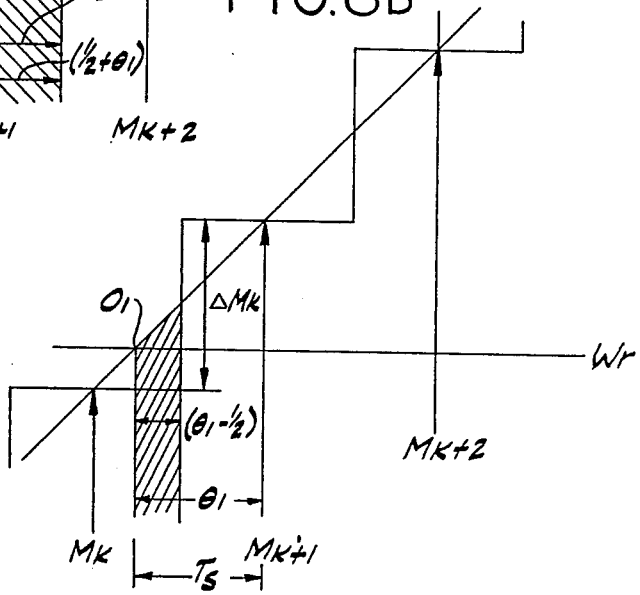

In FIGS. 8(a) and 8(b), if the intersection of the curve and the reference value $W_r$ is point $O_1$, then the sampling data obtained immediately prior to the intersection point $O_1$ is $M_k$; the number of the sampling time interval is "1"; the time difference between the time of intersection point $O_1$ and the center point in time of the $M_{k+1}$ data is $\theta_1$; and $M_k < W_r \leq M_{k+1}$ and $\Delta M_k = M_{k+1} - M_k$. Therefore, as shown in FIGS., 8(a) and 8(b), $\theta_1$ can be expressed in a ratio of data terms, assuming $T_s = 1$, by the following Equation (3):

$$\theta_1 = \frac{M_{k+1} - W_r}{\Delta M_k} \tag{3}$$

Here, if, as shown in FIG. 8(a), $0 \leq \theta_1 < \frac{1}{2}$, the shaded area of FIG. 8a equals the integrated value $\Delta S_b$ (equal to $\Delta S_{k+1}$) for this first term and can be expressed by Equation (4) as follows:

$$\overline{AC} = \overline{AE} + \overline{EC} \tag{4}$$

$$\overline{AC} = \frac{\Delta M_{k+1}}{2} + \frac{\Delta M_k}{2} = \frac{\Delta M_{k+1} + \Delta M_k}{2}$$

$$AC:AB = 1:\theta_1 + \tfrac{1}{2}$$

$$\overline{AB} = \overline{AC} \times (\theta_1 + \tfrac{1}{2}) = \frac{\Delta M_{k+1} + \Delta M_k}{2} \cdot (\theta_1 + \tfrac{1}{2})$$

$$\Delta AB\theta_1 = \tfrac{1}{2}(\theta_1 + \tfrac{1}{2}) \times \overline{AB}$$

$$= \tfrac{1}{2}(\theta_1 + \tfrac{1}{2})(\theta_1 + \tfrac{1}{2})\left(\frac{\Delta M_{k+1} + \Delta M_k}{2}\right)$$

$$= \tfrac{1}{2}(\theta_1 + \tfrac{1}{2})^2\left(\frac{\Delta M_{k+1} + \Delta M_k}{2}\right)$$

Then $$\Delta S_{k+1} = (\tfrac{1}{2} + \theta_1)W_r + \Delta AB\theta_1$$

$$= (\tfrac{1}{2} + \theta_1)W_r + \tfrac{1}{2}(\tfrac{1}{2} + \theta_1)^2\left(\frac{\Delta M_k + \Delta M_{k+1}}{2}\right)$$

In the case of FIG. 8a where $0 \leq \theta_1 < \frac{1}{2}$, because each data time interval is "1", the integration for the portion Sa beginning with the second term can be simply calculated by adding $M_{k+2}$, $M_{k+3}$, etc. In this case, it should be noted that the first data term number in the portion Sa is $k+2$.

In the other case, as shown in FIG. 8(b), if $\frac{1}{2} \leq \theta_1 < 1$, the shaded area of FIG. 8b equals the integrated value $\Delta S_b$ (equal to $\Delta S_k$) for this first term and can be expressed by the following Equation (5);

$$\Delta S_k = (-\tfrac{1}{2} + \theta_1)W_r + \tfrac{1}{2}(-\tfrac{1}{2} + \theta_1)^2 \Delta M_k \tag{5}$$

Similarly, in the case of FIG. 8b where $\frac{1}{2} \leq \theta_1 < 1$, the integration of portion Sa beginning with the second term can be simply calculated by adding Mk+1, Mk+2, etc. In this case, it should be noted that the first data term number in portion Sa is k+1, which differs from that in FIG. 8a.

Next, the procedure for determining the end point and then determining the integrated value of the final end term $\Delta S_e$ from this end point will be explained.

Figure 9A:
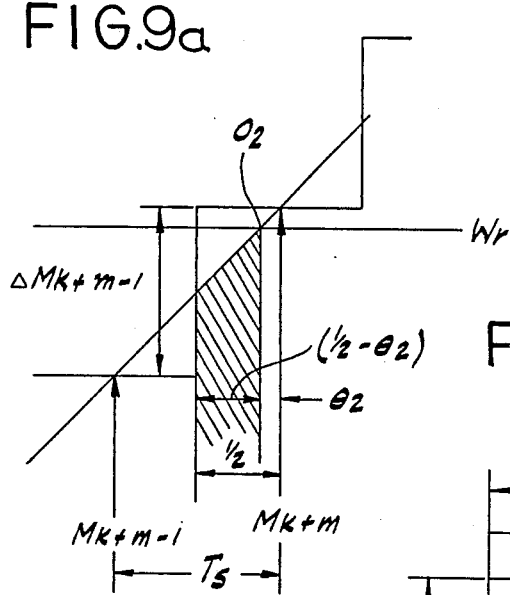
FIGS. 9 (a) and (b) are charts showing the detailed condition of the end point and the final term from FIG. 7.
Figure 9B:
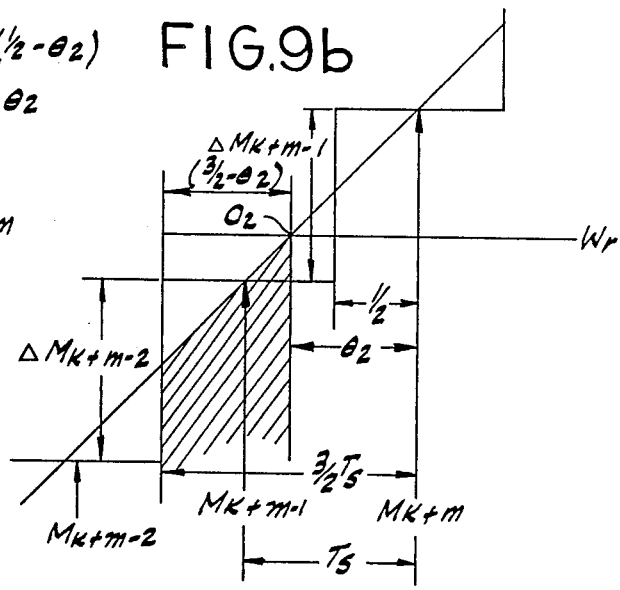

FIGS. 9(a) and 9(b), if the intersection of the curve and the reference value $W_r$ is point $O_2$, then the sampling data obtained immediately after the intersection point $O_2$ is $M_{k+m}$; the time difference between the time of intersection point $O_2$ and the center point in time of the $M_{k+m}$ data is $\theta_2$; and $\Delta M_{k+m-1} = M_{k+m} - M_{k+m-1}$. Therefore, as shown in FIGS. 9(a) and 9(b), $\theta_2$ can be expressed by the following Equation (6);

$$\theta_2 = \frac{M_{k+m} - W_r}{\Delta M_{k+m-1}} \quad (6)$$

Here, if, as shown in FIG. 9(a), $0 \leq \theta_2 < \frac{1}{2}$, the shaded area of FIG. 9a equals the integrated value $\Delta S_e$ (equal to $\Delta S_{k+m}$) for this final term and can be expressed by Equation (7) as follows:

$$\Delta S_{k+m} = (\tfrac{1}{2} - \theta_2)W_r - \tfrac{1}{2}(\tfrac{1}{2} - \theta_2)^2 \Delta M_{k+m-1} \quad (7)$$

In the case of FIG. 9a where $0 \leq \theta_2 < \frac{1}{2}$, the simple integration for portion Sa continues until (ends with) data term Mk+m−1.

In the other case, as shown in FIG. 9(b), if $\frac{1}{2} \leq \theta_2 < 1$, then, the shaded area of FIG. 9(b) equals the integrated value $\Delta S_e$ (equal to $\Delta S_{k+m-1}$) for this final term and can be expressed by the following Equation (8):

$$\Delta S_{k+m-1} = (3/2 - \theta_2)W_r - \tfrac{1}{2}(3/2 - \theta_2)^2 \left( \frac{\Delta M_{k+m-1} + \Delta M_{k+m-2}}{2} \right) \quad (8)$$

In the case of FIG. 9b where $\frac{1}{2} \leq \theta_2 < 1$, the simple integration for portion Sa continues until data term Mk+m−2.

In an example for theoretically practicing the above integration, the processor 9 is programmed to make the calculations explained with reference to equations 2–8 through CPU 92. This operation is explained below While vibratory signals are successively input, each time a digital raw data D is obtained, a rounded data M is calculated.

The rounded data M is compared with the reference value Wr. When it is determined that the data M, increasing after the minimum value Mmin, has reached or first exceeded the reference value Wr, $\theta_1$ is calculated according to equation 3.

At the same time, the integration starts. The first term is integrated according to equation 4 or 5 depending on whether $0 \leq \theta_1 < \frac{1}{2}$ or $\frac{1}{2} \leq \theta_1 < 1$. The data number (k+1 or K+2) for the second data term to be integrated is also determined depending on the value of $\theta_1$. The integrated value Sa for the second and succeeding data is obtained by simple addition.

The data M is a vibratorily varying succession of discrete data When it is determined that the data M, increasing again, has reached or first exceeded the reference value Wr, $\theta_2$ is calculated according to equation 6.

At the same time, the simple integration stops. The final term is then integrated according to equation 7 or 8 depending on whether $0 \leq \theta_2 < \frac{1}{2}$ or $\frac{1}{2} \leq \theta_2 < 1$. The integration of Sa by simple addition continues until or ends with the data just before the final term. The ending data number (k+m−1 or k+m−2) is also determined depending on the value of $\theta_2$. This completes the integrating calculation.

In the above theoretical method, the programs for calculating the integration of the start and end points take a long time in comparison with the simple addition program for calculating the integration of the terms between the start and end points. Therefore, there is a significant loss in time sharing in executing the programs in real time.

Consequently, in an improved method of this invention, Equation (2) can be changed to Equation (2)' as follows:

$$S = S_a' + \Delta S_b' + \Delta S_e' \quad (2)$$

Here, if $S_a'$ is the integrated value of the data from $M_{k+1}$ to $M_{k+m-1}$, $\Delta S_b'$ is the start point corrected value, and $\Delta S_e'$ is the end point corrected value, then the calculation procedure for $S_a'$ is independent of the values for $\theta_1$ and $\theta_2$.

Thus, in this improved embodiment of the invention, the integrated value $S_a'$ can be calculated in real time during multiplexing and while the measurement is in progress. When the measurement is completed, the corrected integrated values $\Delta S_b'$ and $\Delta S_e'$ for the first and final terms are calculated in accordance with the above equations and added to the value $S_a'$ in order to determine the integrated value S.

As described above, the calculation equations for the series of calculation processes used to determine the integrated value S is selected by the CPU 92 in accordance with the applicable conditions. These conditions are summarized in Table 1.

TABLE 1

| Integrated value S = | $S_a'$ | Start point corrected value $\Delta S_b'$ | End point corrected value $\Delta S_e'$ |
|---|---|---|---|
| | $S_a'$ | If $0 \leq \theta_1 < \frac{1}{2}$: <br> $-M_{k+1} + \Delta S_{k+1}$ <br> or <br> If $\frac{1}{2} \leq \theta_1 < 1$: <br> $\Delta S_k$ | If $0 \leq \theta_2 < \frac{1}{2}$: <br> $\Delta S_{k+m}$ <br> or <br> If $\frac{1}{2} \leq \theta_2 < 1$: <br> $-M_{k+m-1} + \Delta S_{k+m-1}$ |

Calculation of the intervals according to the conditions of the first and final terms as specified in Table 1 results in the four possibilities I–IV shown below in Table 2.

TABLE 2

| | First term final term | First term interval | Final term interval | Total number of data items | Number of simply integratable data items excepting first and final terms | Average interval |
|---|---|---|---|---|---|---|
| I | $\theta_1 < \frac{1}{2}$, $\theta_2 < \frac{1}{2}$ | $(\frac{1}{2} + \theta_1)$ | $(\frac{1}{2} - \theta_2)$ | m | m − 2 | $m - 1 + \theta_1 - \theta_2$ |
| II | $\theta_1 < \frac{1}{2}$, $\theta_2 \geq \frac{1}{2}$ | $(\frac{1}{2} + \theta_1)$ | $(3/2 - \theta_2)$ | m − 1 | m − 3 | $m - 1 + \theta_1 - \theta_2$ |
| III | $\theta_1 \geq \frac{1}{2}$, $\theta_2 < \frac{1}{2}$ | $(-\frac{1}{2} + \theta_1)$ | $(\frac{1}{2} - \theta_2)$ | m + 1 | m − 1 | $m - 1 + \theta_1 - \theta_2$ |
| IV | $\theta_1 \geq \frac{1}{2}$, $\theta_2 \geq \frac{1}{2}$ | $(-\frac{1}{2} + \theta_1)$ | $(3/2 - \theta_2)$ | m | m − 2 | $m - 1 + \theta_1 - \theta_2$ |

Figure 10:
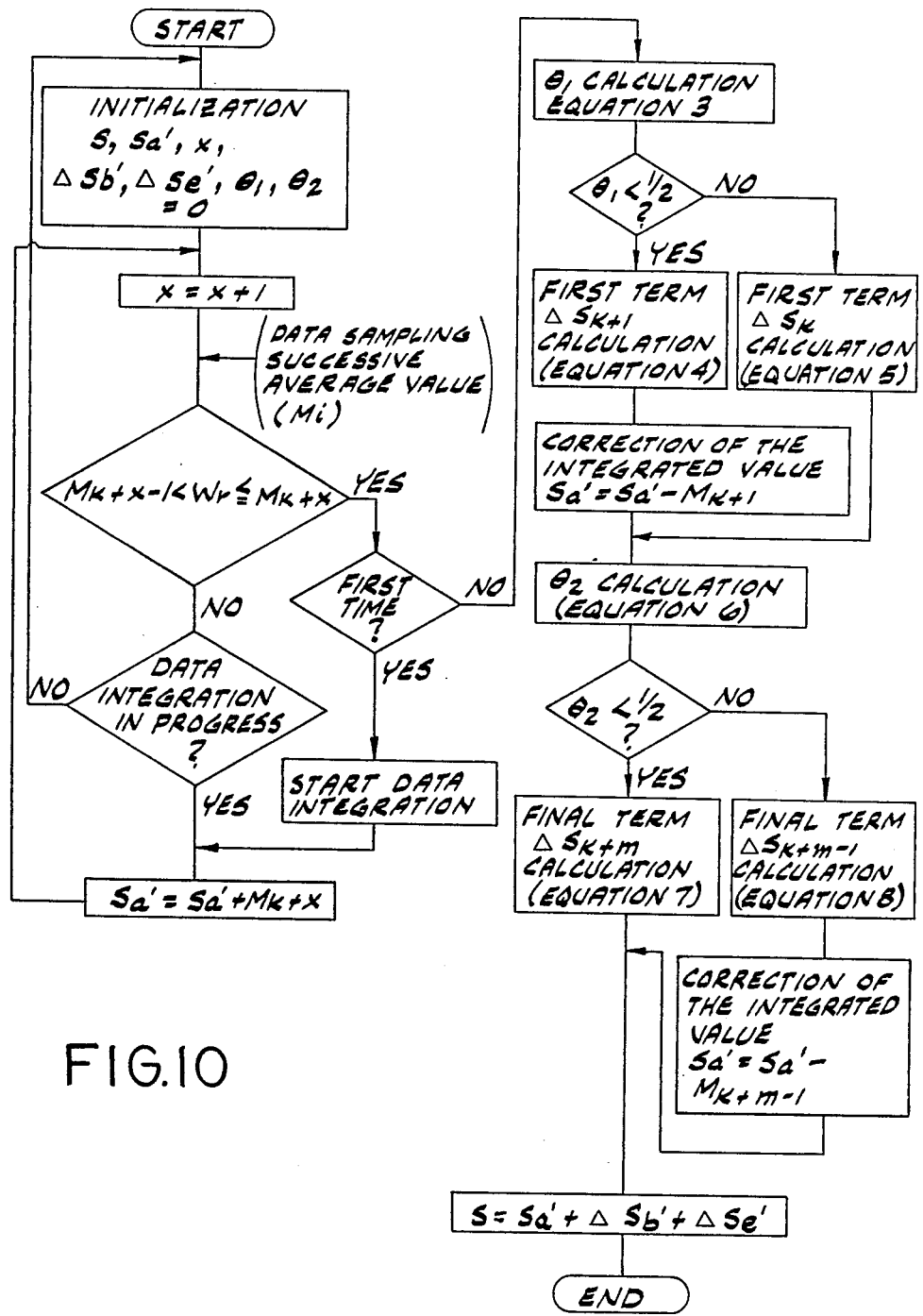
FIG. 10 is the flow chart illustrating the steps for finding the integrated value.

The above series of calculation processes or decision processes (calculation equation selection, etc.) for determining the start and end points $\theta_1$ and $\theta_2$ and the integrated value S are performed by the CPU 92 in accordance with the flowchart shown in FIG. 10 while exchanging input and output with the various memories or input devices.

Then, as shown in the following Equation (9), the CPU divides the integrated value S (the integrated portion of the oscillating signal) which was calculated as described above by the average interval $(m-1+\theta_1-\theta_2)$ in order to calculate the estimated value $W_{es}$ of the weight.

$$W_{es} = \frac{S}{m - 1 + \theta_1 - \theta_2} \quad (9)$$

In addition, the net weight value (estimated value of the net weight of the material being weighed) $W_n$ is calculated by subtracting the zero point measurement value $W_O$ from the above estimated value $W_{es}$ as shown in Equation (10).

$$W_n = W_{es} - W_O \quad (10)$$

By calculating the net weight value based on the integrated interval as described above, the processor 9 comprises means for determining the corresponding weight value of the product based on the integrated portion.

The value $W_O$ is the tare weight obtained by performing the series of measurement processes already described while the hopper is in an empty state (containing none of the material to be weighed), and this value is stored in the memory. If this zero point measurement value $W_O$ is known in advance, it can be input beforehand.

In one preferred embodiment of the invention, multiple scales are used, and the raw weight data input from each of these scales is processed on a timesharing basis. Each time raw weight data is obtained, single or multiplex successive averaging of the scale's data is carried out. At the same time, in accordance with the sequence of the input of the signals from the various scales and the progress of the operation, of the above described series of calculation processes, the corresponding subroutines of the program are executed separately. This type of processing is called real-time multiplexed measurement processing.

Figure 11A:
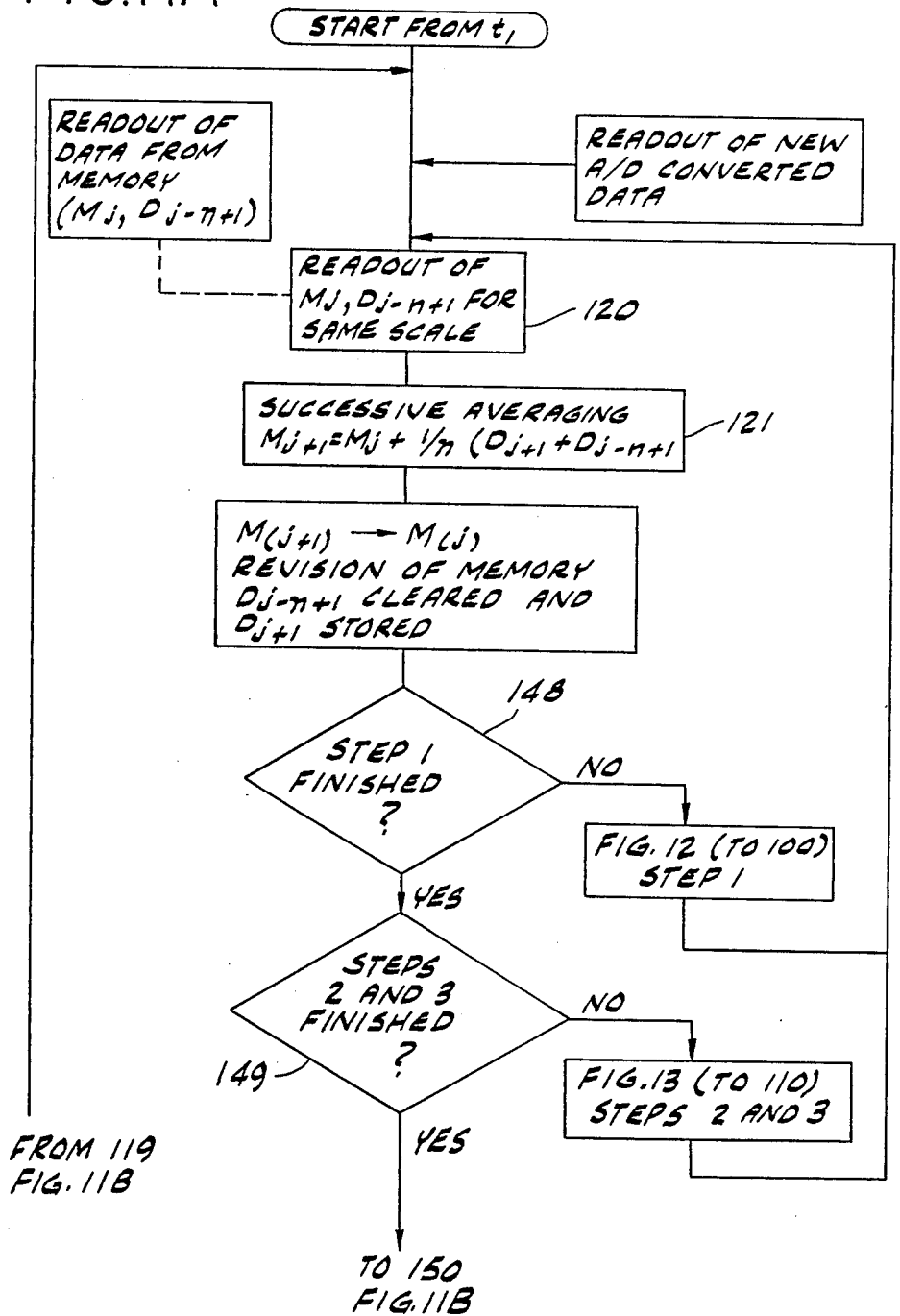
FIGS. 11A, 11B and 11 C are flow charts showing each of the various steps in the real-time multiplex measurement processing.
Figure 11B:
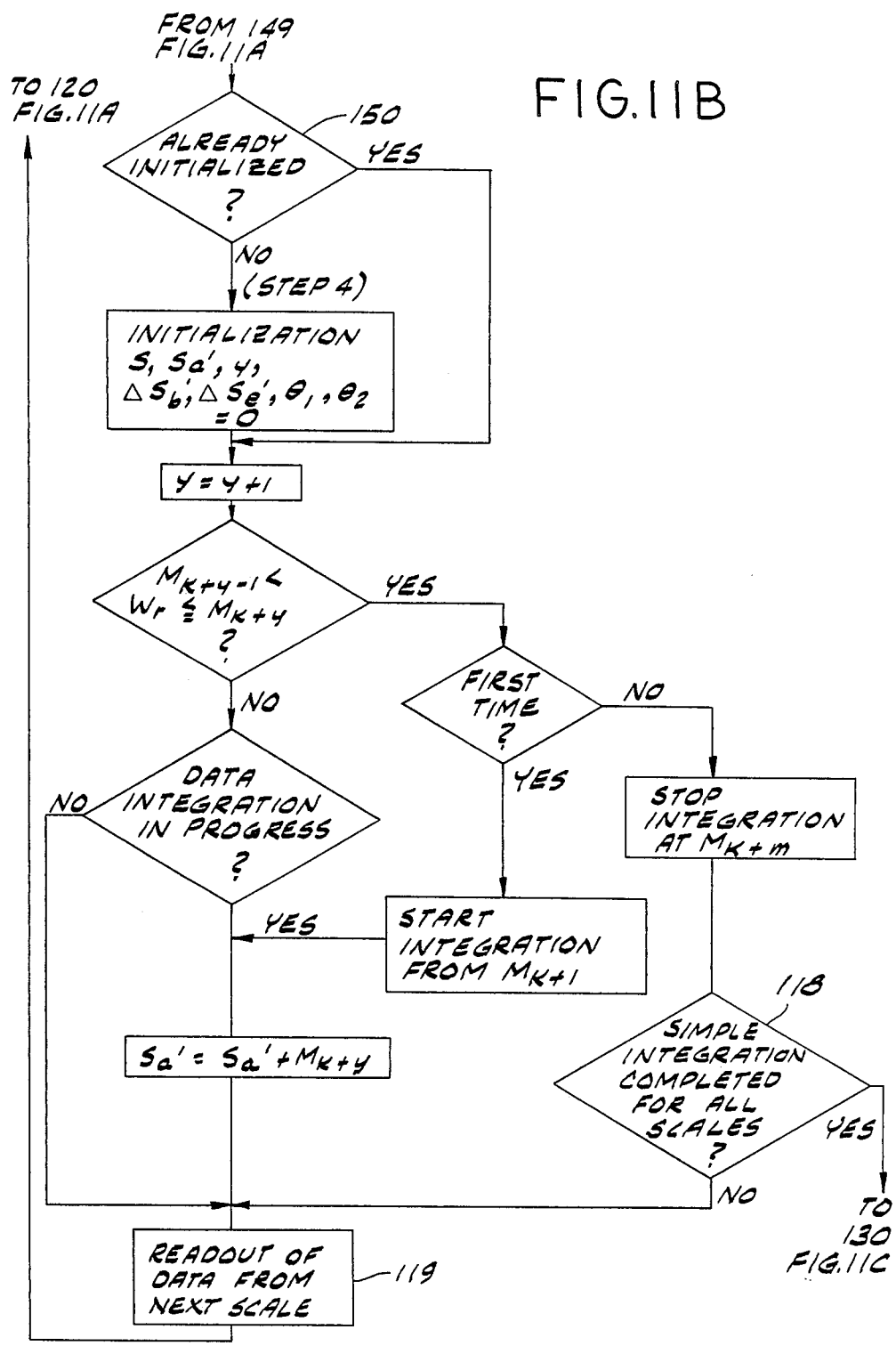
Figure 11C:
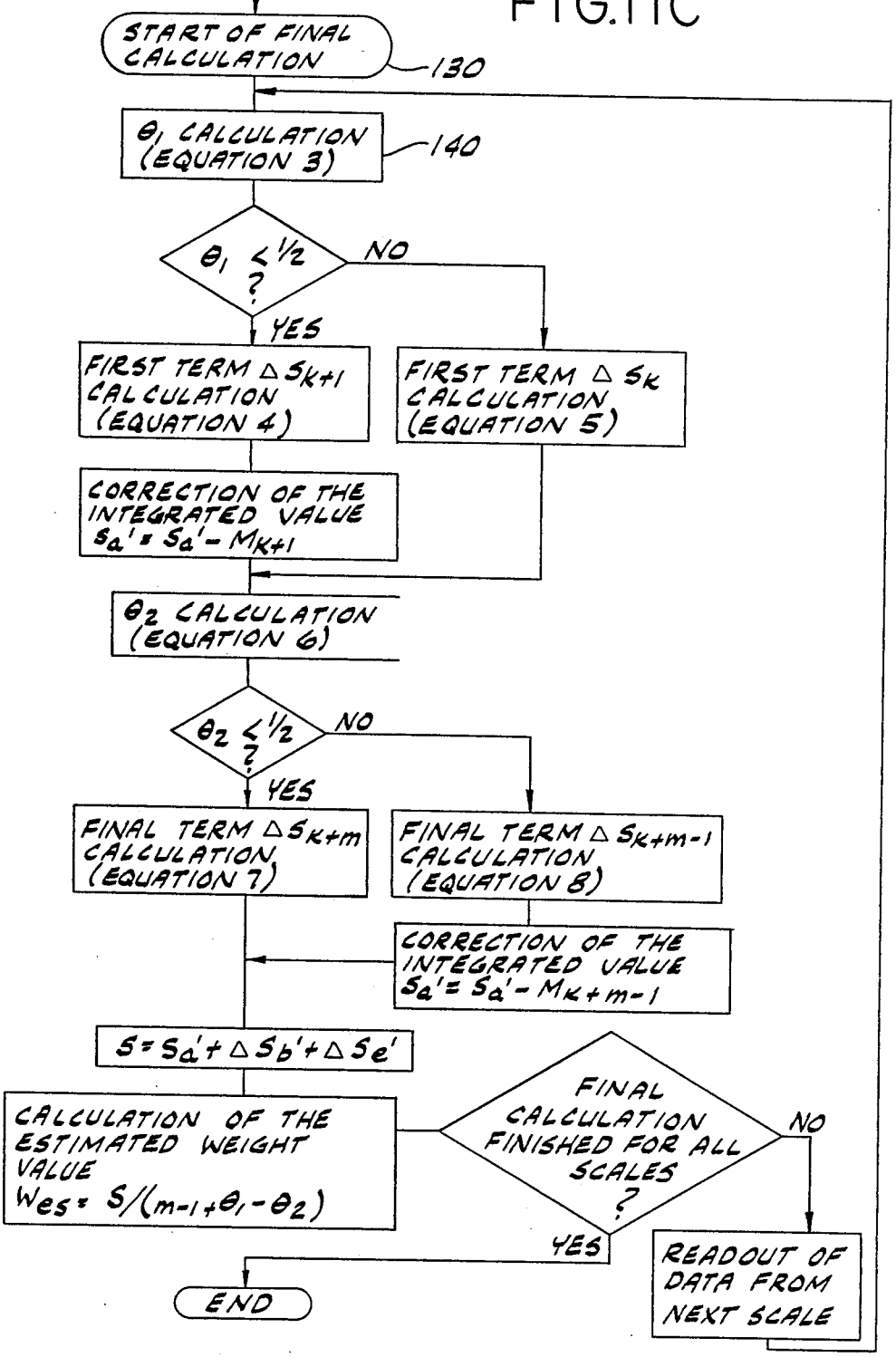

The following is an explanation of one preferred embodiment of the invention in which the real-time multiplexed measurement processing is performed, based on the flowcharts in FIGS. 11A, 11B and 11C. In order to simplify the explanation, a simple calculation of the average will be used for the rounding of data, i.e. the successive average is calculated according to the following Equation (11):

$$M_{j+1} = M_j + 1/n \, (D_{j+1} - D_{j-n+1}) \quad (11)$$

Where $M_{j+1}$ is the new successive average value: $M_j$ is the preceding successive average value: n is the number of average: $D_{j+1}$ is the new measurement data; and $D_{j-n+1}$ is the oldest measurement data used for calculating the successive average.

The new measurement data is input in the sequence indicated by the arrows in FIG. 3. Between the reading of the data from one scale and the reading of the data from the next scale, there will generally be a time interval of approximately 150 to 500 microseconds, although this will vary according to the number of scales. During this interval, the following series of short programs are executed:

(a) Successive average calculation is performed (step 121 of FIG. 11A); this operation is performed continuously while measurement data is being obtained.

(b) Maximum value determination is performed (Step 1 in FIG. 12).

(c) Minimum value determination is performed (Step 2 in FIG. 13); when the minimum value is obtained, calculation of the reference value using Equation (1) is performed (Step 3 in FIG. 13).

(d) After Step 1, 2 and 3 are completed, simple numerical integration is performed (Step 4 in FIG. 11B).

The logic operations or series of short programs of processing operations for the steps in (a), (b) and (c), or (d) are executed in the aforementioned time intervals (usually approximately 150 to 500 microseconds) each time new data is input. Next, the new data of the next scale number is read out, and the same type of procedure is executed. Then, after this series of short programs is executed for each of the scales, the flow goes back to the first scale and the same series of processes is repeated. In other words, the series of steps described above progresses in sequence with the passage of time while switching between the various scales, and the program is executed.

The execution of the program progresses and the series of steps (a)–(d) (short programs) is executed in that order for each of the scales. This completes all the simple integration. The following Step (e) starts after the completion of Steps (a) through (d) for all the scales:

(e) Final calculation procedure (Step 130 in FIG. 11C); after the completion of the numerical integration of all the scales, the start point corrected value is calculated for each scale in accordance with the conditions of $\theta_1$ and the end point corrected value is calculated for each scale in accordance with the conditions of $\theta_2$. Furthermore, the estimated weight value is calculated for all the scales in accordance with Equation (9). The measurement is then completed.

The real-time multiplex processing of Steps (a) through (d) heretofore described can be easily accomplished using a microcomputer with a moderately large capacity.

Note that, in the above-described preferred embodiment, one cycle was determined as being from one increasing state to the next increasing state. It is also contemplated that a cycle may be determined as being from one decreasing state to the next decreasing state.

In addition, in this preferred embodiment, the data from substantially one cycle was sampled for use in the processing.

Alternatively, it is also possible to sample the data from two or more cycles. If this is done although the measurement time will be somewhat longer, there are the advantages of being able to obtain a higher level of precision for the estimated weight value $W_{es}$ and also being able to reduce the effects of errors resulting from noise.

Furthermore, in this preferred emobodiment, the sampling for determining the refrence value $W_r$ is begun after the point in time (after $t_1$ in FIG. 2) at which the material being weighed comes to rest within the receptacle of the scale following the completion of loading. However, as shown in FIG. 2, the weight signal oscillates. In many cases, as shown by the dashed line II in FIG. 2, the central or average value of the vibratory signal gradually, exponentially approaches the stable value of each weighing. In the case where the transient change toward the stable value is always reproducible, the sampling for determining the reference value $W_r$ can be begun prior to the point in time $t_1$ (FIG. 2) at which the material being weighed comes to rest within the receptacle of the scale following the completion of loading For this reason, it is possible to begin the averaging interval ($T_{cu}$) immediately from the point in time $t_1$. In other words, it is possible to use as the interval one cycle (or more) before the cycle used in the embodiment described above. In this case, precision can be maintained by using, in place of Equation (1) for the reference value, the following Equation (1)' providing a weighted average of the data.

$$W_r = \frac{K_1 M_{max} + K_2 M_{min}}{K_1 + K_2} \quad \cdots (1)'$$

where $K_1$ and $K_2$ are coeffiecients determined by experimentation or by an experimental equation from the data obtained from the input waveform. For example, if the weight signal is a transient response waveform such as that shown in FIG. 2, preferably, $K_1 = 1$ and $K_2 = 2$.

Thus, by using an average interval ($T_{cu}$ of the input signal which is one cycle (or more) earlier than that used in the embodiment heretofore described, the measurement time can be shortened and the responsiveness improved. In other words, it is possible to achieve high-speed measurement. In addition, as already explained, when determining the reference value, by using a weighted average, it is possible to perform measurements with approximately the same accuracy as that of the heretofore described embodiment.

In addition, by starting the average interval ($T_{cu}$) one cycle (or more) earlier than in the embodiment shown in FIG. 2 and performing numerical integration for two cycles, is it possible to obtain an estimated weight value with a higher level of precision than the heretofore described emobodiment in the same measurement time as that embodiment.

Furthermore, if a slight drop in measurement precision can be permitted, it is also possible to begin the average interval ($T_{cu}$) from a point in time prior to the point $t_1$ in FIG. 2 at which the material being weighed comes to rest within the receptacle of the measurement device following the completion of the loading of said material. Using a real-time processing method, it is possible to simultaneously perform the measurements and processing operation for multiple scales. In addition, as shown in Equation (4), (5), (6), (7) and (8), the numerical integrations are precise equations which include, together with the first term and final term, the fraction ratios of the samples. For example, Equation (4) includes the primary term ($\frac{1}{2} + \theta_1$) as well as the secondary term ($\frac{1}{2} + \theta_1)^2$. Because of this, the precision is higher than in other apparatus and methods, such as a method in which a weight estimation method for intervals in which fractions of the first term, final term, etc., are not included, or a method using integration equations of only the primary terms of the first and final term.

Thus, even though the number of samples may be less than with other methods, it is possible to obtain the same level of precision. This is one of the major factors which make possible the simultaneous real-time processing of multiple scales.

Furthermore, if the measurement signal contains a DC component and a sinusoidal oscillation component, as in this embodiment, it is best to begin the numerical integration of the successive data obtained from this signal from the point at which the phase of the original sinusoidal signal is 0°, or close to 0°, and use an accurate interval which corresponds to that single cycle. This is because, if the start point is 0°, even if there is interval error in the cycle estimate, the effect of this interval error on the estimated weight value will be minimized.

In the weighing method of this invention as described above, the weight signal, which includes a sinusoidal oscillation component of the scale being used to measure the weight of supplied material, is converted into a digital value, and then this data, or a rounded version of this data, is used as successive digital data. Using this successive digital data, a reference value is then calculated from the maximum value and the minimum value of the data preceding or following the anticipated completion of the supply of the material being weighed.

Then, within the region in which the values of the successive digital data increase or decrease, a start point is determined from the data which first reaches or crosses the reference value and the data which precedes that data. Next, within a separate subsequent region of increase or decrease, an end point is determined from the data which reaches or exceeds the reference value and the date which precedes that data.

The aggregate value of the data contained in the interval between the start and end points is obtained as a interval for integration, and then an estimated value of the weight of the material being weighed is caluclated by averaging the data by the interval between the start and end points.

Thus, using the weighing method of this invention, as explained above, a reference value is calculated from the maximum and minimum values of the successive digital data preceding or following the anticipated completion of the supply of the material being weighed. Then, within the region in which the values of the successive digital data increase or decrease, a start point is determined from the data which first reaches or crosses the reference value and the data which precedes that data. Next, within a separate subsequent region of increase or decrease, an end point is determined from the successive digital data which reaches or crosses the reference value and the data which precedes that data. By doing this, it is possible to determine with greater accuracy a predefined number of cycles of the successive digital data. The predefined number may be any integral number of cycles.

The data contained in the interval between the start and end points, which is preferably one cycle or a number of cycles which is a multiple of one, of the successive digital data, is numerically integrated in order to find the aggregate value (integral value), and this aggregate value is then averaged by the interval between the start and end points. By doing this, the estimated value of the weight obtained through this averaging process is a highly precise measurement value. (In this specification, the interval between the start and end points used to obtain this integrated value is sometimes referred to as the "average interval").

In addition, with the method just described, because an accurate single cycle, or a number of cycles which is a multiple of one, is determined in order to perform numerical integration, and then averaging by the interval is performed, it is possible to obtain an accurate measurement value of the weight in a very short time, even during a state of oscillation.

Note that, in the heretofore described preferred embodiment, if the rounded successive data contains a slight amount of random noise, the data in the vicinity of $M_k$ is selected appropriately, and this data, including $M_k$, is processed once again by the successive averaging method. This processed data can be used to correctly determine the start point. If the data contains noise, it is also possible to process the data once by a method using a weighted function, such as that described in the assignee's Japanese Patent Application No. 61-125079 filed on May 29, 1986.

In addition, in the heretofore described embodiment, there has been no reference made to the type of the material being weighed, and the material can be either loose multiple-piece matter or individual single-piece matter.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An apparatus for weighing product comprising:
   means for weighing the product and adapted to produce an oscillating signal indicative of the weight of the product;
   first means for determining a maximum value and a minimum value of the oscillating signal and for determining a reference value which is a function of an average of the maximum and minimum values;
   second means, responsive to the reference value determined by the first means, for identifying a portion of the oscillating signal having a predefined number of cycles, said portion starting and ending with values substantially equal to said reference value;
   third means for integrating the portion of the oscillating signal identified by the second means; and
   fourth means for determining the corresponding weight value of the product based on the integrated portion.

2. The apparatus of claim 1 further comprising:
   means for sampling the oscillating signal; and
   means for converting each sample into a discrete value so that the portion of the oscillating signal is represented by a series of discrete values having a first value and a last value which approximately equal said reference value;
   wherein the reference value determined by the first means substantially equals an average of the maximum and minimum value;
   wherein said third means integrates said discrete values included in said portion of the oscillating signal; and
   wherein said fourth means determines the corresponding weight value of the product based on the total of and the number of integrated, discrete values.

3. The apparatus of claim 2 further including means for compensating for errors in the relationship between the first value and the reference value and means for compensating for errors in the relationship between the last value and the reference value.

4. The apparatus of claim 3 wherein the means for compensating calculates the first value and its error and the last value and its error so that said errors are proportionally related.

5. The apparatus of claim 2 wherein the means for determining a maximum value and a minimum value comprises means for comparing each successive discrete value with the previous highest discrete value and the previous lowest discrete value, respectively.

6. The apparatus of claim 2 wherein the third means for integrating comprises means for integrating the first value of the series, means for integrating the last value of the series and means for integrating the discrete values of the series between the first value and the last value.

7. The apparatus of claim 6 further including means for compensating for errors between the integral of the first value and the integral of the reference value and means for compensating for errors between the integral of the last value and the integral of the reference value.

8. The apparatus of claim 2 wherein the fourth means for determining comprises a divider for dividing the integrated values by the number of discrete values within the portion.

9. The apparatus of claim 2 wherein the first means comprises means for comparing each successive value with the previous highest value and the previous lowest value, said reference value corresponding to the highest and lowest value.

10. The apparatus of claim 2 wherein the means for weighing comprises a combination weighing apparatus having a plurality of scales producing a plurality of oscillating signals and further including means for multiplexing the plurality of oscillating signals.

11. The apparatus of claim 10 wherein the reference value are determined by real time signal processing during the period that the plurality of oscillating signals are being sampled by the means for sampling and converted by the means for converting.

12. The apparatus of claim 10 wherein the reference value are determined by real time signal processing during the period that the plurality of oscillating signals are being multiplexed by the means for multiplexing.

13. The apparatus of claim 1 wherein the fourth means for determining comprises a divider for dividing the integrated portion by the period within the portion.

14. The apparatus of claim 1 wherein the predefined number of cycles is an integer greater than or equal to one.

15. The apparatus of claim 1 wherein said first means includes means for determining a maximum value $M_{max}$ and a minimum value $M_{min}$ of the oscillating signal and wherein said reference value $W_r$ equals $(K_1 M_{max} + K_2 - M_{min})/(K_1 + K_2)$ where $K_1$ and $K_2$ are predetermined coefficients.

16. An apparatus for weighing product comprising:
means for weighing the product and adapted to produce an oscillating signal indicative of the weight of the product;
means for sampling the oscillating signal and for converting each sample into a discrete value;
first means for determining a maximum value and a minimum value of the oscillating signal and a reference value related to the maximum and minimum values;
second means, responsive to the reference value determined by the first means, for identifying a portion of the oscillating signal represented by a series of discrete values having a first value and a last value and having a predefined number of cycles;
third means for integrating the portion of the oscillating signal identified by the second means; and
fourth means for determining the corresponding weight value of the product based on the integrated portion; and
means for compensating for errors in the relationship between the first value and the reference value; and
means for compensating for errors in the relationship between the last value and the reference value.

17. An apparatus for weighing product comprising:
means for weighing the product and adapted to produce an oscillating signal indicative of the weight of the product;
means for sampling the oscillating signal and for converting each sample into a discrete value;
first means for determining a maximum value and a minimum value of the oscillating signal by comparing each successive discrete value with the previous highest discrete value and the previous lowest discrete value, respectively, and for determining a reference value related to the maximum and minimum values;
second means, responsive to the reference value determined by the first means, for identifying a portion of the oscillating signal represented by a series of discrete values having a first value and a last value and having a predefined number of cycles;
third means for integrating the portion of the oscillating signal identified by the second means; and
fourth means for determining the corresponding weight value of the product based on the integrated portion.

18. An apparatus for weighing product comprising:
means for weighing the product and adapted to produce an oscillating signal indicative of the weight of the product;
means for sampling the oscillating signal and for converting each sample into a discrete value;
first means for determining a maximum value and a minimum value of the oscillating signal and a reference value related to the maximum and minimum values;
second means, responsive to the reference value determined by the first means, for identifying a portion of the oscillating signal represented by a series of discrete values having a first value and a last value and having a predefined number of cycles;
third means for integrating the first value of the series, the last value of the series and the discrete values of the series between the first value and the last value; and
fourth means for determining the corresponding weight value of the product based on the integrated portion;
means for compensating for errors between the integral of the first value and the integral of the reference value; and
means for compensating for errors between the integral of the last value and the integral of the reference value.

19. An apparatus for weighing product comprising:
means for weighing the product and adapted to produce an oscillating signal indicative of the weight of the product;
first means for determining a maximum value $M_{max}$, a minimum value $M_{min}$ and a reference value $W_r$ of the oscillating signal wherein $W_r = (K_1 M_{max} + K_2 - M_{min})/(K_1 + K_2)$ where $K_1$ and $K_2$ are predetermined coefficients;
second means, responsive to the reference value determined by the first means, for identifying a portion of the oscillating signal having a predefined number of cycles;
third means for integrating the portion of the oscillating signal identified by the second means; and
fourth means for determining the corresponding weight value of the product based on the integrated portion.

20. A method for weighing product comprising the steps of:
weighing the product and producing an oscillating signal indicative of the weight of the product;
determining a minimum and a maximum value of the oscillating signal;
determining a reference value which is a function of an average of the maximum and minimum values;
identifying portion of the oscillating signal having a predefined number of cycles based upon the determined reference value, said portion starting and ending with values substantially equal to said reference value;
integrating the identified portion of the oscillating signal; and
determining the corresponding weight value of the product based on the integrated portion.

21. The method of claim 20 further comprising the steps of:
sampling the oscillating signal; and
converting each sample into a discrete value so that the portion of the oscillating signal is represented by a series of discrete values having a first value and a last value which approximately equals the reference value;
wherein the reference value substantially equals an average of the maximum and minimum values;
wherein said step of integrating comprises integrating the discrete values included in the portion of the oscillating signal; and
wherein said step of determining comprises determining the corresponding value of the weight product based on the total of and the number of integrated, discrete values.

22. The method of claim 21 further including the steps of compensating for errors in the relationship between the first value and the reference value and compensating for errors in the relationship between the last value and the reference value.

23. The method of claim 22 wherein the step of compensating comprises calculating the first value and its error and the last value and its error so that said errors are proportionally related.

24. The method of claim 21 wherein the step of determining the maximum value and the minimum value comprises comparing each successive discrete value with the previous highest discrete value and the previous lowest discrete value.

25. The method of claim 21 wherein the step of integrating comprises integrating the first value of the series, integrating the last value of the series and integrating the discrete values of the series between the first value and the last value.

26. The method of claim 25 further including the steps of compensating for errors between the integral of the first value and the integral of the reference value and compensating for errors between the integral of the last value and the integral of the reference value.

27. The method of claim 21 wherein the step of determining the corresponding weight value comprises dividing the integrated value by the number of discrete values within the portion.

28. The method of claim 21 wherein the step of determining a reference value comprises comparing each successive value with the previous highest value and the previous lowest value, said reference value corresponding to the highest and lowest value.

29. The method of claim 28 wherein the step of weighing comprises using a combination weighing apparatus having a plurality of scales producing a plurality of oscillating signals and further including the step of multiplexing the plurality of oscillating signals.

30. The method of claim 29 wherein the reference values are determined by real time signal processing during the period that the plurality of oscillating signals are being sampled and converted.

31. The method of claim 29 wherein the reference values are determined by real time signal processing during the period that the plurality of oscillating signals are being multiplexed.

32. The method of claim 20 wherein the step of determining the corresponding weight value comprises dividing the integrated portion by the period within the portion.

33. The method of claim 20 wherein the predefined number of cycles is an integer greater than or equal to one.

34. The method of claim 20 wherein the step of determining includes determining a maximum value $M_{max}$ and a minimum value $M_{min}$ of the oscillating signal and wherein said reference value equals $(K_1 M_{max} + K_2 M_{min})/(K_1 + K_2)$ where $K_1$ and $K_2$ are predetermined coefficients.

35. A method for weighing product comprising the steps of:
weighing the product and producing an oscillating signal indicative of the weight of the product;
sampling the oscillating signal;
converting each sample into a discrete value;
determining a maximum value and a minimum value of the oscillating signal and a reference value relating to the maximum and minimum values;
identifying a portion of the oscillating signal having a predetermined number of cycles based upon the determined reference value, said portion represented by a series of discrete values having a first value and a last value;
integrating the identified portion of the oscillating signal;
determining the corresponding weight value of the product based on the integrated portion;
compensating for errors in the relationship between the first value and the reference value; and
compensating for errors in the relationship between the last value and the reference value.

36. A method for weighing product comprising the steps of:
weighing the product and producing an oscillating signal indicative of the weight of the product;
sampling the oscillating signal;
converting each sample into a discrete value;
determining a maximum value and a minimum value of the oscillating signal by comparing each successive discrete value with the previous highest discrete value and the previous lowest discrete value, respectively;
determining a reference value relating to the maximum and minimum values;
identifying a portion of the oscillating signal having a predefined number of cycles based upon the determining reference value, said portion represented by a series of discrete values having a first value and a last value;
integrating the identified portion of the oscillating signal; and
determining the corresponding weight value of the product based on the integrated portion.

37. A method for weighing product comprising the steps of:
weighing the product and producing an oscillating signal indicative of the weight of the product;
sampling the oscillating signal;
converting each sample into a discrete value;
determining a maximum value and a minimum value of the oscillating signal and a reference value relating to the maximum and minimum values;
identifying a portion of the oscillating signal having a predefined number of cycles based upon the determining reference value, each said portion represented by a series of discrete values having a first value and a last value;

integrating the identified portion of the oscillating signal;

determining the corresponding weight value of the product based on the integrated portion;

compensating for errors between the integral of the first value and the integral of the reference value; and compensating for errors between the integral of the last value and the integral of the reference value.

38. A method for weighing product comprising the steps of:

weighing the product and producing an oscillating signal indicative of the weight of the product;

sampling the oscillating signal;

converting each sample into a discrete value;

determining a maximum value $M_{max}$, a minimum value $M_{min}$ and a reference value $W_r$ of the oscillating signal; wherein $W_r=(K_1 M_{max}+K_2 M_{min})/(K_1+K_2)$ where $K_1$ and $K_2$ are predetermined coefficients;

identifying a portion of the oscillating signal having a predetermined number of cycles based upon the determined reference value, said portion represented by a series of discrete values having a first value and a last value;

integrating the identified portion of the oscillating signal; and determining the corresponding weight value of the product based on the integrated portion.

* * * * *